May 20, 1958  R. J. JONES ET AL  2,835,287
CUTTING TOOLS INCORPORATING SAFETY DEVICES
Filed May 29, 1956
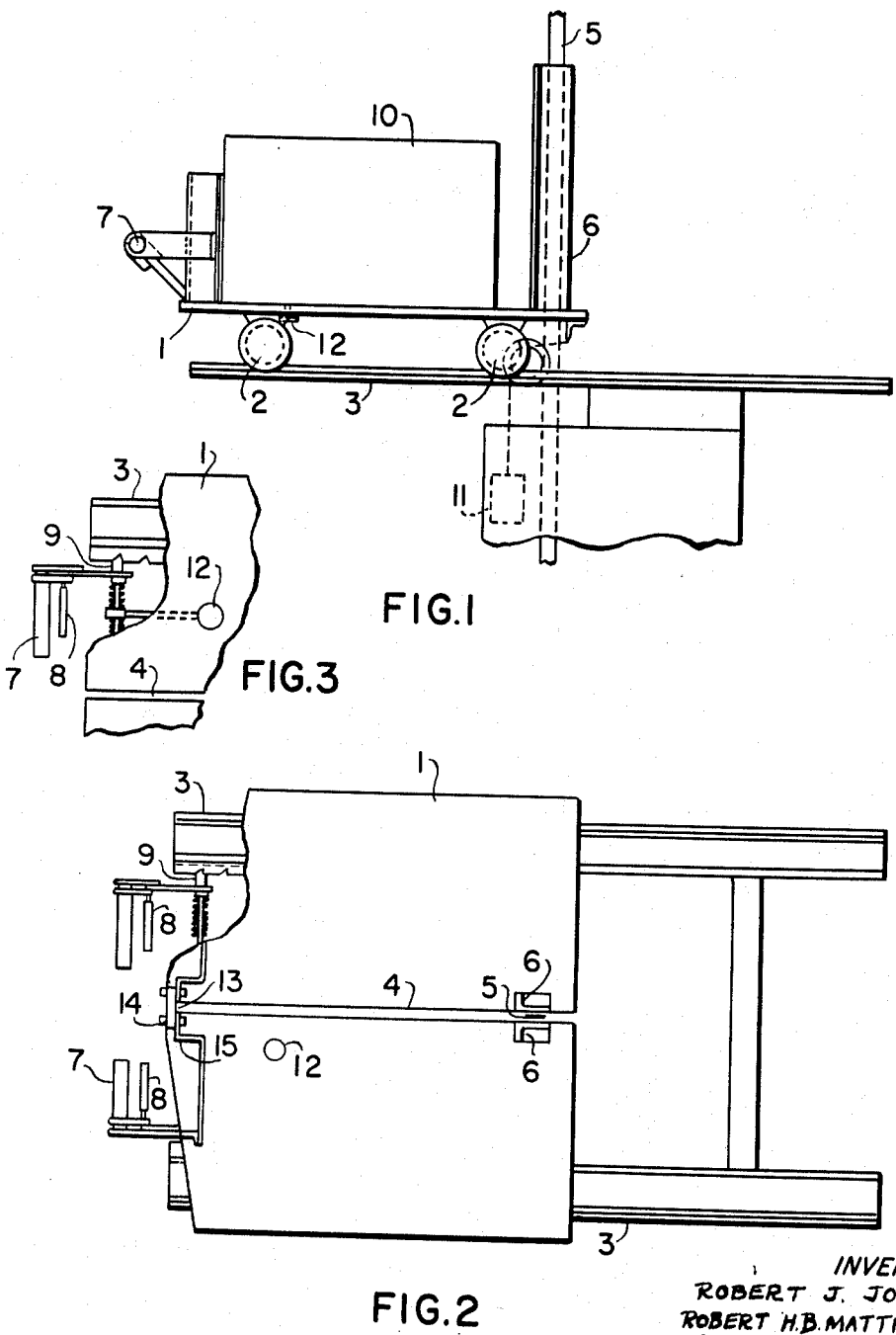
INVENTORS
ROBERT J. JONES
ROBERT H.B. MATTHEWS
by JOHN E. F. TERRY
ATTORNEY

United States Patent Office 2,835,287
Patented May 20, 1958

2,835,287

CUTTING TOOLS INCORPORATING SAFETY DEVICES

Robert John Jones, Upper Norwood, London, Robert Henry Burnell Matthews, Upminster, and John Eaton Foy Perry, Chorley Wood, England, assignors to The Distillers Company Limited, Edinburgh, Scotland, a British company Application May 29, 1956, Serial No. 588,027

Claims priority, application Great Britain June 17, 1955

7 Claims. (Cl. 143—159)

The present invention relates to safety devices for machine-driven saws and knives and more particularly to a modified form of table for use with band saws, circular saws, band knives and reciprocating saws hereinafter referred to as cutting tools.

The use of safety devices in one form or another in connection with numerous different types of cutting tools is well known. Saw blades, for example, are normally guarded over unused sections of their length or periphery in order to reduce chances of accidental contact of the operator's hands with the saw blade. However, since quite bulky pieces of work have often to be cut, a considerable portion of the blade is usually left unguarded. This constitutes a danger to the operator whose hands may approach the blade while pushing the workpiece forward towards the cutting edge. Even if the workpiece is moved forward mechanically, it is difficult to ensure that the operator cannot touch the blade with his hands.

It is an object of the present invention to provide a cutting tool incorporating an improved safety device.

According to the present invention, a cutting tool comprises a movable table adapted to support the workpiece to be cut and bearing a slot to accommodate the blade of the tool, a retractable guard partly surrounding the blade when the table is in its home position, and a locking device preventing the table being moved towards the blade and having a releasing mechanism which can only be operated with two hands whereby the table can be moved to bring a workpiece against the blade.

The locking device and releasing mechanism are preferably in the form of a pawl and ratchet device which enables the table to be pulled towards the operator freely but only pushed towards the blade when the pawl and ratchet are disengaged by means such as a hand operated lever or a spring-loaded twist grip. In order that the table may be released only by the use of both the operator's hands, such a ratchet mechanism may be duplicated, there being one on either side of the table. Alternatively, two hand operated levers or hand operated spring-loaded twist grips may be adapted to retract the same pawl, one, for instance, operating as a safety catch while the other engages the pawl to move it away from the ratchet. Instead of a ratchet mechanism, a braking mechanism may be substituted, the hand-operated levers being used to retract one or more spring-loaded friction pads. If desired, however, the table may be released by means of an electrical device or of a compressed air device operated by the use of two press-action switches. As an additional safety measure, the table is preferably fitted with means to return it to its original "home" position after it has been pushed forward to conduct a cutting operation. If the table is fitted with an unidirectional locking device such as the ratchet mechanism described above, this may conveniently take the form of a counterweight which is raised when the table is pushed forwards and will serve to return the table to its "home" position.

It is an essential feature of the invention that the cutting tool comprises one or more guards around the blade which are removed from the blade as the workpiece to be cut is pushed towards the blade. Preferably the guards partly surround the blade. While in a preferred embodiment of the invention the guards are rigidly attached to the table so that the blade is exposed only when the table is moved forward, other types of guard may be used. The guards may, for instance, be pivotally attached to some fixed point above the table, the latter serving to lock them in position while the action of moving the table forwards releases the guards, which may then hinge backwards under the action of the workpiece, as the blade moves through the latter; in this case the table may be fitted with a device such as a stud, whereby the guards are kept in position over the blade when the machine is not in use. Alternatively, the guards may be arranged to be retracted vertically when the table is moved towards the blade.

A further safety device which may be fitted to the table comprises a projecting button which can be depressed by the weight of a workpiece. The button is connected by suitable means to the locking and releasing mechanism and is so arranged that when there is no workpiece on the table to depress the button, it is impossible to move the table.

The table is suitably arranged to move by being mounted on rollers, or on wheels which run on rails, or on ball- or roller-bearings.

Additional safety features of known type, such as wire mesh guards around the saw table, may be provided, if desired.

In the accompanying drawings, which are for a particular embodiment of the invention, Figure 1 shows a side elevation of part of a band saw incorporating the safety device of the invention and Figures 2 and 3 show a plan view of the same apparatus.

In the figures, the saw table 1, is mounted on wheels 2, travelling on the rails 3. The saw table bears a slot 4, to accommodate the saw blade 5. Guards 6, are mounted on the saw table and protect the blade when the saw table is in the "home" position, as shown. The saw table is fitted with handles 7, and levers 8, operating ratchets 9, of which one only is shown as revealed by the cut away portion of the saw table. The workpiece to be cut, for instance, a block of solid carbon dioxide 10, is mounted on the saw table in the position shown in Figure 1, the weight of the block serving to depress the button 12, which co-operates with the ratchet mechanism by means of levers and linkages shown diagrammatically in Figure 3 so that the table cannot be moved unless the work is in position. When making a cut, the workpiece and saw table are pushed forward by squeezing the levers 8, applying forward pressure to the handles until the cut has been completed, whereupon the counterweight 11, serves to return the saw table to the "home" position, whether or not the ratchet is in the released position.

In order to change the saw blade, the plate 14, which normally closes the slot 13, in the channel shaped bracket 15, is removed, the plate being rebolted in position when the new blade has been fitted. This arrangement enables blade changing to be carried out without removing the saw table.

We claim:

1. A cutting tool comprising a base, work-supporting table having a slot and horizontally movable on said base between a work-loading and -unloading and a work-cutting position, a cutting element supported by the base and extending through the slot and movable through a plane at substantially a right angle to the table for cutting action, a retractable guard movable on and with the table and partly surrounding the cutting element when the table is in the loading position, tracks on the base along which the table is movable towards and away from the cutting position, the guard retracting from the cutting element by the movement of the table towards the cutting position, locking means for preventing movement of the table along the tracks toward the cutting position, the locking means being provided with a releasing mechanism operable only by both hands of an operator and means for moving the table into the cutting position when the locking means are held released.

2. A cutting tool in accordance with claim 1, wherein the said guard is rigidly attached to said movable table.

3. A cutting tool in accordance with claim 1, wherein the locking means and releasing mechanism comprise a pawl and ratchet arranged to enable the table to be pulled freely toward the operator but moved toward the cutting element only when the pawl and ratchet are disengaged.

4. A cutting tool in accordance with claim 3, wherein hand operated levers are provided for disengaging the pawl and ratchet.

5. A cutting tool in accordance with claim 4, wherein the hand operated levers are disposed one on each side of the table.

6. A cutting tool in accordance with claim 1, wherein the movable table is provided with means for automatically returning it to its original home position when the operator ceases to operate the table moving means.

7. A cutting tool in accordance with claim 6, wherein the returning means comprises a counterweight which is raised during the movement of the table toward the cutting position.

References Cited in the file of this patent

UNITED STATES PATENTS

| | | |
|---|---|---|
| 1,225,545 | Whitaker | May 8, 1917 |
| 1,784,028 | Pollard | Dec. 9, 1930 |
| 2,297,882 | Gardner et al. | Oct. 6, 1942 |

FOREIGN PATENTS

| | | |
|---|---|---|
| 301,679 | Great Britain | Dec. 6, 1928 |
| 686,888 | France | Apr. 22, 1930 |
| 607,490 | Germany | Dec. 28, 1934 |